(12) United States Patent
Jain

(10) Patent No.: US 8,707,162 B1
(45) Date of Patent: Apr. 22, 2014

(54) METHODS AND SYSTEMS FOR REDUCING WEB PAGE TRANSMISSION BANDWIDTH

(75) Inventor: Arvind Jain, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 166 days.

(21) Appl. No.: 13/053,805

(22) Filed: Mar. 22, 2011

(51) Int. Cl.
*G06F 17/24* (2006.01)
*G06F 17/25* (2006.01)

(52) U.S. Cl.
USPC .......................................... 715/234; 715/237

(58) Field of Classification Search
USPC ................................................ 715/234, 237
See application file for complete search history.

(56) References Cited

U.S. PATENT DOCUMENTS

| | | | |
|---|---|---|---|
| 6,094,662 A | 7/2000 | Hawes | |
| 6,366,947 B1 | 4/2002 | Kavner | |
| 6,606,525 B1* | 8/2003 | Muthuswamy et al. | 700/52 |
| 7,512,623 B2* | 3/2009 | Apps et al. | 1/1 |
| 7,594,001 B1* | 9/2009 | Ebbo et al. | 709/219 |
| 8,286,149 B2* | 10/2012 | Dor et al. | 717/141 |
| 8,516,117 B2* | 8/2013 | Munger et al. | 709/225 |
| 8,533,221 B2* | 9/2013 | Barclay et al. | 707/771 |
| 8,577,795 B2* | 11/2013 | Clubb et al. | 705/39 |
| 2006/0229896 A1* | 10/2006 | Rosen et al. | 705/1 |
| 2009/0254707 A1* | 10/2009 | Alstad | 711/118 |
| 2010/0278454 A1* | 11/2010 | Huffer | 383/5 |
| 2011/0213655 A1* | 9/2011 | Henkin et al. | 705/14.49 |

OTHER PUBLICATIONS

Lakshmish Ramaswamy, Arun Iyengar, Ling Liu, and Fred Douglis. 2004. Automatic detection of fragments in dynamically generated web pages. In Proceedings of the 13th international conference on World Wide Web (WWW '04). ACM, New York, NY, USA, 443-454. DOI=10.1145/988672.988732 http://doi.acm.org/10.1145/988672.988732.*

Hypertext Transfer Protocol—HTTP/1.1 Standard, Chapter 14, W3 Network Working Group, 46 pages as provided (Jun. 1999), available at http://www.w3.org/Protocols/rfc2616/rfc2616.html.*

* cited by examiner

*Primary Examiner* — Laurie Ries
*Assistant Examiner* — Soumya Dasgupta
(74) *Attorney, Agent, or Firm* — Sterne, Kessler, Goldstein & Fox P.L.L.C.

(57) ABSTRACT

Embodiments disclosed herein relate to reduction of web page transmission bandwidth by resolving a web page into static and dynamic components. An embodiment includes intercepting a request for a web page, retrieving the requested web page from a server, reading transmission instructions for the web page, the instructions based on an analysis of two or more identified versions of the web page, the analysis having identified one or more static and dynamic components of the web page, extracting the dynamic components of the retrieved web page based on the instructions, and providing the dynamic components of the web page along with one or more references to the static components in response to the request. Another embodiment includes constructing a web page for display using the received dynamic components and static components retrieved from a cache using the one or more references.

10 Claims, 8 Drawing Sheets

METHODS AND SYSTEMS FOR REDUCING WEB PAGE TRANSMISSION BANDWIDTH

BACKGROUND

1. Field

Embodiments generally relate to web content transmission, and particularly to web page transmission bandwidth.

2. Background

Web pages are becoming increasingly rich in content. As a result, the amount of data (e.g., bytes) needed to convey a complete web page is also increasing. Downloading such content rich web pages can be a slow process that can take multiple seconds depending on available network bandwidth between a web browser and a web server.

A web page normally contains content (e.g., text, video, audio etc.), content formatting instructions (e.g., stylesheets), user interface (UI) elements (e.g., buttons) and UI associated code that defines interactivity of the web page. Out of these, content formatting instructions, user interface (UI) elements and UI associated code are generally static (or unchanging), and account for most of the web page's bytes. Because these web page components are static, it is generally a waste of network resources and time to download them at each web page request.

BRIEF SUMMARY

Embodiments relate to reduction of web page transmission bandwidth. An embodiment includes intercepting a request for a web page, retrieving the requested web page from a server, reading transmission instructions for the web page, the instructions based on an analysis of two or more identified versions of the web page, the analysis having identified one or more static and dynamic components of the web page, extracting the dynamic components of the retrieved web page based on the instructions, and providing the dynamic components of the web page along with one or more references to the static components in response to the request.

An embodiment for resolving a web page into static and dynamic components includes tracking content transmitted for a web page over a network to identify different versions of the web page, comparing two or more identified versions of the web page, resolving the web page into one or more static and dynamic components based on the comparing, and storing the static components of the web page with instructions to enable separation of the web page into the static and the dynamic components.

An embodiment for constructing a web page comprises receiving web content from a server, where the web content includes one or more dynamic components of a web page, locating references to static components of the web page from the received web content, retrieving the static components using the located references from a cache, and constructing a complete web page using the received dynamic components and the cached static components.

In this way, by resolving a web page into static and dynamic components, and by transmitting the dynamic components of the web page, embodiments reduce web page transmission bandwidth.

Further embodiments, features, and advantages of the embodiments, as well as the structure and operation of the various embodiments are described in detail below with reference to accompanying drawings.

BRIEF DESCRIPTION OF THE FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Embodiments relate to reduction of web page transmission bandwidth by resolving a web page into static and dynamic components. In an embodiment, web pages (or content) may be resolved into static and dynamic components by tracking content transmitted for a web page over a network to identify different versions of the web page. Two or more identified versions of the web page are compared in order to determine static (e.g., unchanging) and dynamic (e.g., changing) components of the web page. Based upon this comparison, the web page is separated into the one or more static and dynamic components.

In an embodiment, the static components may be stored in a client cache. When the client requests a web page, a server transmits the dynamic components of the web page along with references to the static components. As a non limiting example, such references may be web addresses, local addresses, identifiers or any other form of references or pointers. The client then locates references to static components of the web page from the received web content and retrieves the static components using the located references from the cache. The client proceeds to construct a complete web page using the received dynamic components and the retrieved static components. Because, static components of the web page are locally cached at the client (e.g., cached during previous downloads of the web page), they need not be retrieved from the server. Instead, in an embodiment, the dynamic components are retrieved from the server. Therefore, both transmission bandwidth and latency may be reduced as a portion of the web page, instead of the entire web page, is generally transmitted over the network in order to display a complete web page at the client.

Figure 1:
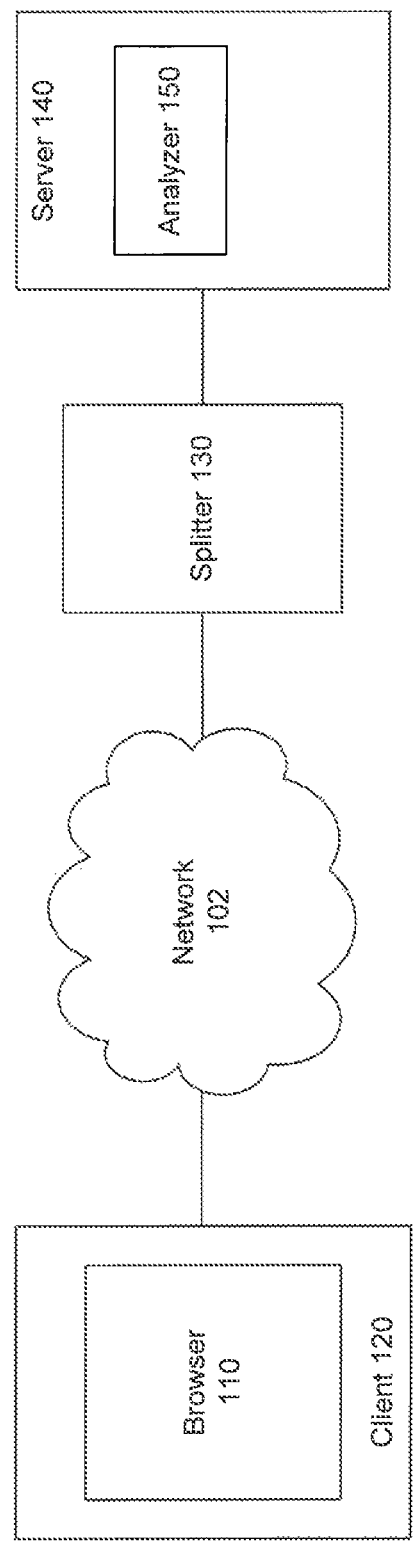
FIG. 1 is a diagram of a system for reducing web page transmission bandwidth, according to an embodiment.

The following describes a system for reduction of web page transmission bandwidth according to embodiments illustrated in FIGS. 1-8. FIG. 1 is a diagram of an embodiment of system 100 for reduction of web page transmission bandwidth. While the following is described in terms of FIG. 1, the embodiments are not limited to the embodiment illustrated in FIG. 1. For example, any system having generally the structure of FIG. 1, or that would benefit from the operation, methods and functions as described herein may be used.

In an exemplary embodiment, system 100 shows client 120 comprising browser 110, which may be used to connect to server 140 over one or more networks 102. According to an embodiment, browser 110 may include any device, application or module that enables a user or computer to navigate and/or retrieve data from another data source, typically over a network. Browser 110 may include any conventional web browser such as those that are widely available. According to a further embodiment, browser 110 may also be configured to use any number of protocols, known now or developed in the future, including protocols such as HTTP, FTP, and underlying protocols such as TCP/IP or UDP.

Browser 110 can further communicate with an input (not shown) to allow a user to input data, to input commands, or to provide other control information to browser 110. Browser 110 may request content from server 140, based on user input. Server 140 may respond to the request by providing content back to browser 110 and client 120 via network 102. Browser 110 may also be configured to retrieve content from server 140 without user intervention. In an embodiment, browser 110 can communicate with splitter 130 over network 102. The operation of splitter 130 is discussed further below.

In an embodiment, network(s) 102 may be any type of data network or combination of data networks including, but not limited to, a local area network (LAN), a medium area network, or a wide area network such as the Internet. Network 102, for example, may be a wired or wireless network that allows client 120 and server 140 to communicate with each other. Network 102 can further support world-wide-web (e.g. Internet) protocols and services.

Server 140 may provide content (e.g., web pages, applications (or "apps"), audio, video, etc.) that can be retrieved by client 120 over network 102. Content retrieved by client 120 can be disseminated via browser 110.

In an embodiment, client 120, server 140 and splitter 130 may each be implemented on a computing device. Such a computing device may include, but is not limited to, a personal computer, mobile device such as a mobile phone, workstation, embedded system, game console, television, set-top box, or any other computing device that can support web browsing. Such a computing device may include, but is not limited to, a device having a processor and memory for executing and storing instructions. Such a computing device may include software, firmware, and hardware. The computing device may also have multiple processors and multiple shared or separate memory components. Software may include one or more applications and an operating system. Hardware can include, but is not limited to, a processor, memory and graphical user interface display. An optional input device, such as a mouse or touch screen, may be used.

FIG. 1 further illustrates analyzer 150 and server 140, which may be coupled directly or indirectly. In an embodiment, for a given web page, analyzer 150 keeps track of content delivered over network 102 over time. Analyzer 150 may compare different historical versions of the web page to determine which portions of the web page are static (i.e., unchanging or substantially unchanging over time) and which are dynamic (i.e., changing or substantially changing over time). Based on this analysis, and according to an embodiment, analyzer 150 stores the static components of the web page, as well as instructions to resolve the web page into static and dynamic components.

As a purely illustrative example, not intended to limit the invention, static components (or static portions) of the web page may include content formatting instructions (e.g., stylesheets), user interface (UI) elements (e.g., buttons) and UI associated code that defines interactivity of the web page. As a purely illustrative example, not intended to limit the invention, dynamic components (or dynamic portions) of the web page may include any content such as video, audio and text. These examples are purely illustrative and it is to be appreciated that static and dynamic components may include any data transmitted as a part of web content.

According to an embodiment, analyzer 150 may include any device, application or module that resides alongside (or within) the web serving infrastructure of a web site. In another embodiment, analyzer 150 may be a module resident in server 140 as shown in FIG. 1.

In an embodiment, splitter 130 resides between the network 102 and server 140. In another embodiment, splitter 130 may reside between client 120 and network 102 or may even exist as a separate module connected to network 102. In an exemplary embodiment, when client 120 requests a web page via browser 110, splitter 130 intercepts the request and determines whether the entire web page should be provided or if web page components, such as the dynamic and/or the static portions of the web page should be transmitted to client 120 as described below. In an exemplary embodiment, if the requested web page has been previously visited, browser 110 may have stored at least the static components of the web page. The operation of splitter 130 is described further below.

Figure 2:
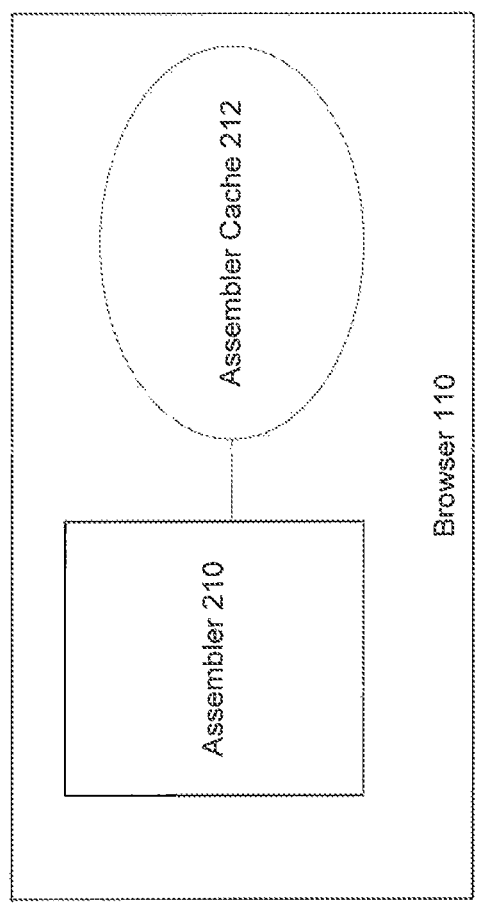
FIG. 2 is a diagram of a browser, according to an embodiment.

FIG. 2 illustrates an exemplary system 200 for assembling dynamic and static components of a web page into a complete web page, according to an embodiment. In the embodiment, browser 110 includes assembler 210 and assembler cache 212. In an exemplary embodiment, upon requesting a web page, browser 110 receives dynamic components of a requested web page, along with references to static components of the web page. In addition, browser 110 may also receive instructions for integrating (or assembling) the dynamic components of the web page with the static components of the web page. Assembler 210 may use the references and instructions received from splitter 130 to integrate the dynamic components of the web page with the static components of the page as described below. In this way, assembler 210 generates a complete web page for display on browser 110.

In an exemplary embodiment, assembler cache 212 stores static portions of web pages visited using browser 110. In a further exemplary embodiment, assembler cache 212 may contain static portions of a number of the most visited web sites on the Internet. In these exemplary embodiments, assembler 210 produces the complete, requested web page after receiving a response from splitter 130 which includes references to the static components stored in assembler cache 212.

In each of these embodiments, either the dynamic portion or static portions of the web page may contain a time to live (TTL) value. Therefore, for example, the static components of the web page may expire in assembler cache 212 after a pre-defined, or user defined, period of time. Similarly, dynamic components of the web page stored or cached at server 140 may also expire after a pre-defined period of time. Such TTL values may allow the most updated version of the web page to be provided to client 120.

Although the following is discussed in terms of a web page, it is to be appreciated that embodiments and modules discussed herein can be configured to work with a plurality of web pages. For example, analyzer 150 can track historical versions of a plurality of web pages over time.

Figure 3:
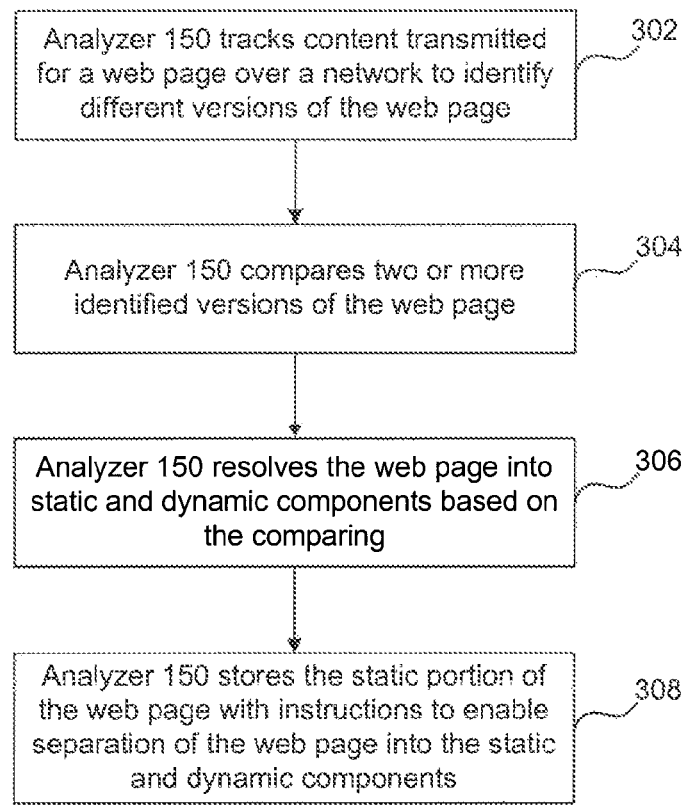
FIG. 3 is a flowchart illustrating an operation of an analyzer, according to an embodiment.

FIG. 3 illustrates an exemplary method 300, for resolving (or separating) a web page into dynamic and static components, according to an embodiment.

Method 300 begins with analyzer 150 tracking content transmitted for a web page over network 102 over time, to identify different versions of the web page (step 302). In an exemplary embodiment, when a web page (e.g., "news.google.com") is requested from server 140, analyzer 150 begins to track the web page's content transmitted over network 102 (e.g., in subsequent requests for the web page).

Analyzer 150 compares two or more identified versions of the tracked web page (step 304). In an exemplary embodiment, a number of these identified and tracked web page versions are compared over time to determine static and dynamic components of the tracked web page. For example, certain user interface buttons on the "news.google.com" web page may remain unchanged over time. These buttons (and their associated code) may be determined by analyzer 150 to be static components of the news.google.com web page. On the other hand, text content (e.g., prices of products, advertisements, etc.) may be determined by analyzer 150 to be dynamic (or changing) components.

Analyzer 150 resolves the web page into static and dynamic components based on step 304 (step 306) and analyzer 150 stores the static portion of the web page with instructions to enable separation of the web page into the static and dynamic components (step 308). The static and dynamic components of the web page may be stored on server 140 before being transmitted over the network 102. In an exemplary embodiment, the static components of a web page are stored in both server 140 and assembler cache 212 on client 120. In an exemplary embodiment, analyzer 150 may provide instructions to splitter 130 for assembler 210 to retain the static component of the web page in assembler cache 212.

In this way, embodiments enable resolution (or separation) of a web page into static and dynamic components.

Figure 4:
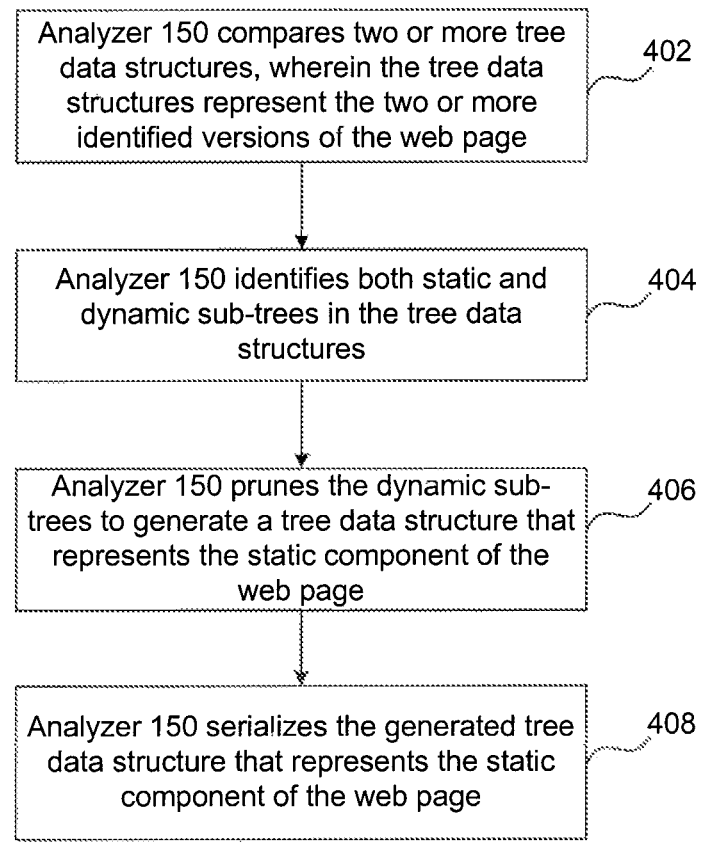
FIG. 4 is a flowchart illustrating an operation of an analyzer, according to another embodiment.

FIG. 4 illustrates an exemplary method 400, for resolving a web page into dynamic and static components, according to another exemplary embodiment.

Method 400 begins with analyzer 150 comparing two or more tree data structures, where the tree data structures represent the two or more identified versions of a web page (e.g., web page versions identified in step 302) (step 402). Data structures are, for example, a particular way of storing and organizing data in a computer so that it can be used efficiently. A tree is a widely-used data structure that emulates a hierarchical tree structure with a set of linked nodes. In a non-limiting embodiment, the tree data structures may include the HTML code, mark-up language, data or other code representing a web page.

Analyzer 150 identifies both static and dynamic sub-trees in the tree data structures (step 404). As an example, analyzer 150 may compare two or more tree data structures that represent the two or more identified versions of the same tracked web page to identify both static and dynamic sub-trees.

Analyzer 150 prunes (or removes) the dynamic sub-trees to generate a tree data structure that represents static components of the web page (step 406). Then, analyzer 150 serializes the pruned tree data structure that represents the static component of the web page (step 408). As an illustrative example, not intended to limit the embodiments, serialization is a process of converting a data structure or object into a format that can be stored (for example, in a file or memory buffer, or transmitted across a network connection link) and "resurrected" later in the same or another computer environment. These tree data structures may allow the dynamic and/or static components of a web page to be transmitted efficiently over network 102.

Figure 5:
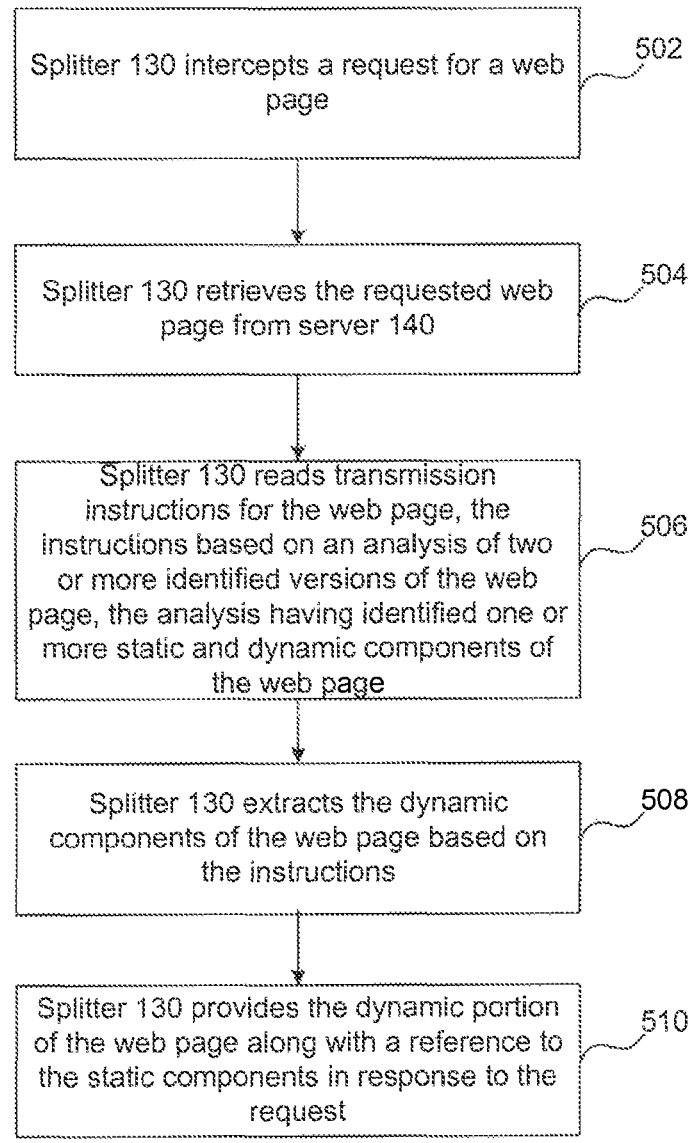
FIG. 5 is a flowchart illustrating an operation of a splitter, according to an embodiment.

FIG. 5 illustrates an exemplary method 500 for extracting and providing dynamic components of a web page, according to an embodiment.

Working in conjunction with the methods discussed in FIGS. 3 and 4 above, splitter 130 intercepts a request for a web page from client 120 (step 502). As an example, splitter 130 may intercept a request for the "news.google.com" web page.

Splitter 130 retrieves the requested web page from server 140 (step 504). As an example, splitter 130 retrieves the "news.google.com" web page from server 140.

Splitter 130 reads transmission instructions for the web page from analyzer 150 (step 506). As an example, the instructions are generated by analyzer 150 based on an analysis of two or more identified versions of the web page, the analysis having identified one or more static and dynamic components of the web page. Transmission instructions may be stored by analyzer 150 in step 308 discussed above.

Splitter 130 extracts the dynamic components of the web page based on the instructions provided by server 140 and analyzer 150 (step 508). In response to the web page request of step 502, splitter 130 transmits the dynamic components of the web page along with references to static components of the web page (step 510). In an embodiment, the references may enabler assembler 210 to locate and retrieve appropriate static components of the web page from assembler cache 212 so that a complete web page may be constructed for display on browser 110. As a non limiting example, such references may be web addresses, local addresses, identifiers or any other form of references or pointers. In this way, splitter 130 transmits dynamic components of the web page along with references to the static components and instructions to assembler 210 to retrieve the static components of the web page from assembler cache 212.

In an embodiment, splitter 130 adds a Hypertext Transfer Protocol (HTTP) header to dynamic components of the web page. As a non limiting example, this header may provide instructions to assembler 210 for integrating the static and dynamic components into a complete web page on client 120. In an embodiment, if analyzer 130 determines that static components of the web page have changed, the static components of the web page may be transmitted across network 102. In an embodiment, when client 120 requests a web page that may have not been previously requested (i.e., requests a web page for the first time), splitter 130 provides both the static and dynamic components of the requested web page to client 120. This is because the static components of the web page may not be previously stored in assembler cache 212. In this way, client 120 is able to store the static components of a web page in assembler cache 212, when the web page is first requested from server 140. Because the static components of the web page are now stored in assembler cache 212, splitter 130 need not transmit the static components to client 120 in subsequent requests for the same web page.

Further to the method 500 illustrated in FIG. 5, when the instructions read by (or provided to) splitter 130 in step 506 are inadequate, inaccurate, and/or corrupted assembler 212 may respond to splitter 130 indicating an error with the instructions. After attempts to correct the error by retrieving the transmission instructions again, splitter 130 along with server 140, may provide both the static and dynamic components of the web page (i.e. the complete web page) to assembler 210. Therefore, in an example where the instructions read by (or provided to) splitter 130 in step 506 are inadequate, inaccurate, and/or corrupted, the entire web page, including both static and dynamic components, may be transmitted to client 120 by splitter 130 and server 140.

Figure 6:
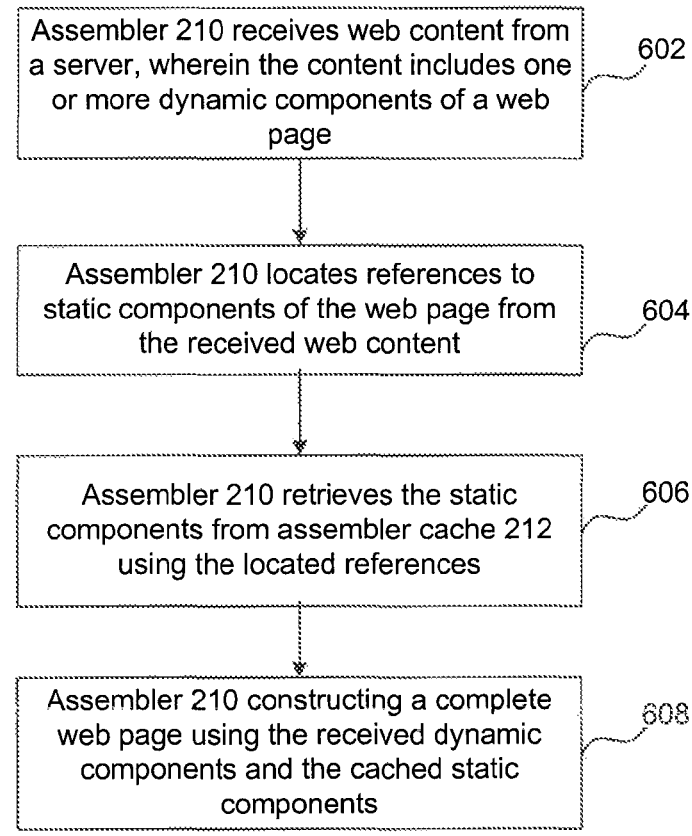
FIG. 6 is a flowchart illustrating an operation of an assembler, according to an embodiment.

FIG. 6 illustrates an exemplary method 600, for reconstructing a web page using both its dynamic and static components, according to an embodiment.

Assembler 210 receives web content from server 140, where the content includes one or more dynamic components of a web page. (step 602).

Assembler 210 locates references to static components of the web page from the content received in step 602 (step 604). As a non limiting example, such references may be web addresses, local addresses, identifiers or any other form of references or pointers.

In an exemplary embodiment, the static portions of the web page may be stored in assembler cache 212. Assembler 210 retrieves the static components from assembler cache 212 using the located references (step 606). Assembler 210 then constructs a complete web page using both the received dynamic components and the cached static components (step 608). The web page may be rendered more quickly because one or more static components of the web page were not transmitted over the network 102 and were instead locally retrieved from assembler cache 212 located at client 120. Furthermore, transmission load on the network 102 may be reduced.

Figure 7:
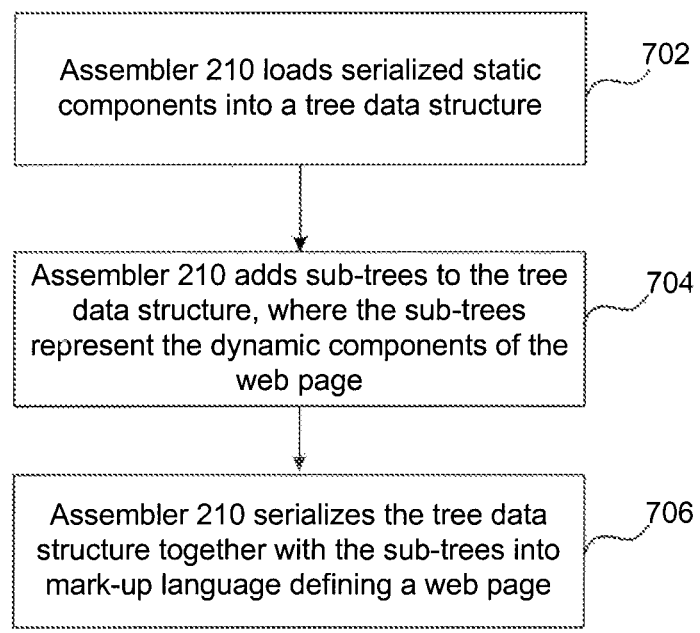
FIG. 7 is a flowchart illustrating an operation of an assembler, according to another embodiment.

FIG. 7 illustrates an exemplary method 700, for constructing a web page using both dynamic and static web page components, according to another embodiment. Similar to the method described in FIG. 6 above, in method 700 assembler 210 may receive serialized static components from splitter 130. Assembler 210 loads serialized static components into a tree data structure (step 702). It is to be appreciated that assembler 210 may user any other data structure to load (or store) static serialized components. Assembler 210 adds sub-trees to the tree data structure, where the sub-trees represent the dynamic components of the web page (step 704). Assembler 210 serializes the tree data structure together with the sub-tees into mark-up language (e.g., HTML) defining a complete web page (step 706). The complete web page is rendered on client 120 using browser 110.

Example Computer Embodiment

Figure 8:
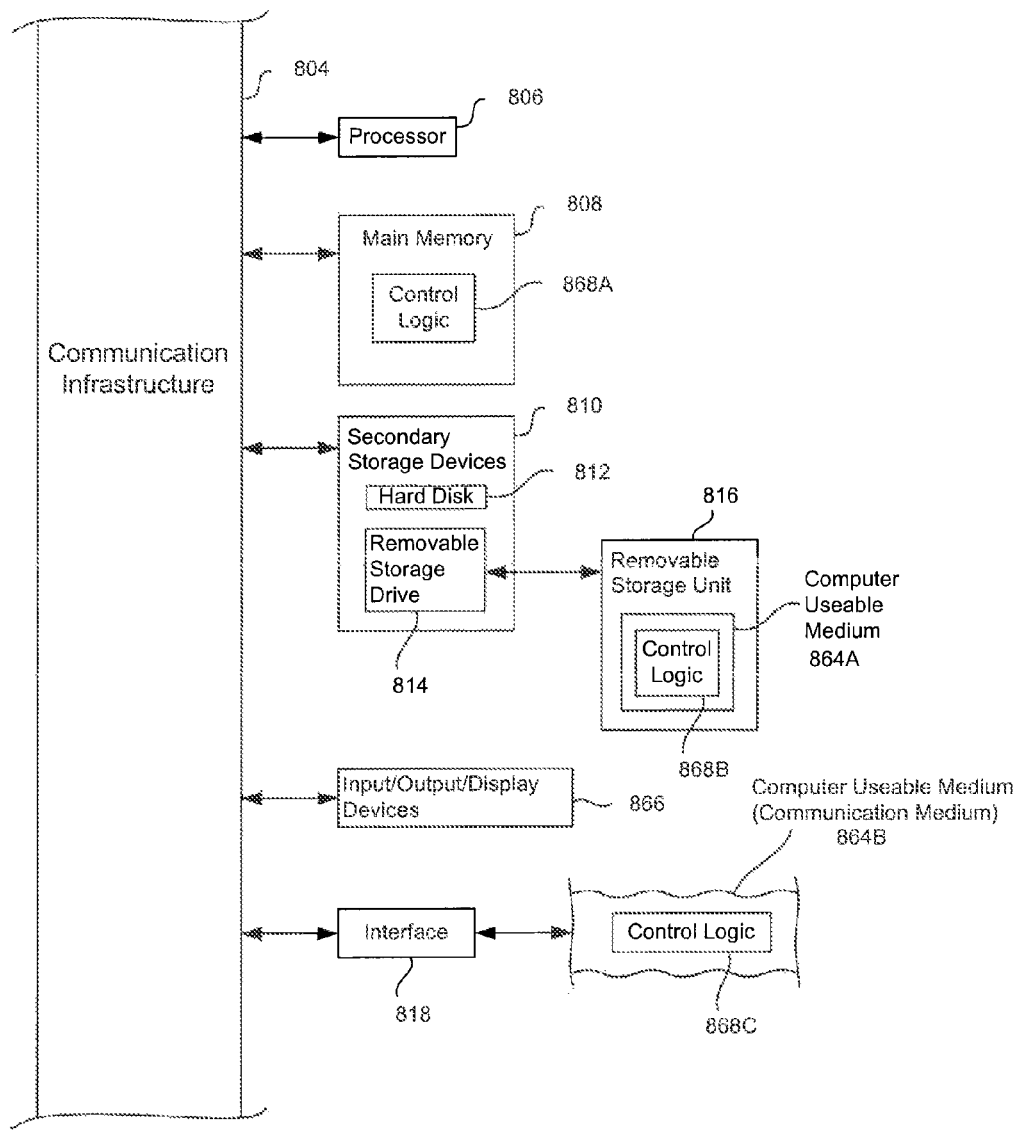
FIG. 8 illustrates an example computer useful for implementing components of the embodiments.

In an embodiment, the system, methods and components of embodiments described herein are implemented using one or more computers, such as example computer 802 shown in FIG. 8. For example, client 120, server 140 and splitter 130 can be implemented using computer(s) 802.

Computer 802 can be any commercially available and well known computer capable of performing the functions described herein, such as computers available from International Business Machines, Apple, Oracle, HP, Dell, Cray, etc.

Computer 802 includes one or more processors (also called central processing units, or CPUs), such as a processor 806. Processor 806 is connected to a communication infrastructure 804.

Computer 802 also includes a main or primary memory 808, such as random access memory (RAM). Primary memory 808 has stored therein control logic 868A (computer software), and data.

Computer 802 also includes one or more secondary storage devices 810. Secondary storage devices 810 include, for example, a hard disk drive 812 and/or a removable storage device or drive 814, as well as other types of storage devices, such as memory cards and memory sticks. Removable storage drive 814 represents a floppy disk drive, a magnetic tape drive, a compact disk drive, an optical storage device, tape backup, etc.

Removable storage drive 814 interacts with a removable storage unit 816. Removable storage unit 816 includes a computer useable or readable storage medium 864A having stored therein computer software 868B (control logic) and/or data. Removable storage unit 816 represents a floppy disk, magnetic tape, compact disk, DVD, optical storage disk, or any other computer data storage device. Removable storage drive 814 reads from and/or writes to removable storage unit 816 in a well known manner.

Computer 802 also includes input/output/display devices 866, such as monitors, keyboards, pointing devices, Bluetooth devices, etc.

Computer 802 further includes a communication or network interface 818. Network interface 818 enables computer 802 to communicate with remote devices. For example, network interface 818 allows computer 802 to communicate over communication networks or mediums 864B (representing a form of a computer useable or readable medium), such as LANs, WANs, the Internet, etc. Network interface 818 may interface with remote sites or networks via wired or wireless connections.

Control logic 868C may be transmitted to and from computer 802 via communication medium 864B.

Any tangible apparatus or article of manufacture comprising a computer useable or readable medium having control logic (software) stored therein is referred to herein as a computer program product or program storage device. This includes, but is not limited to, computer 802, main memory 808, secondary storage devices 810 and removable storage unit 816. Such computer program products, having control logic stored therein that, when executed by one or more data processing devices, cause such data processing devices to operate as described herein, represent the embodiments.

Embodiments can work with software, hardware, and/or operating system implementations other than those described herein. Any software, hardware, and operating system implementations suitable for performing the functions described herein can be used. Embodiments are applicable to both a client and to a server or a combination of both.

It is to be appreciated that the Detailed Description section, and not the Summary and Abstract sections, is intended to be used to interpret the claims. The Summary and Abstract sections may set forth one or more but not all exemplary embodiments of the present embodiments as contemplated by the inventor(s), and thus, are not intended to limit the present embodiments and the appended claims in any way.

The present embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the present embodiments. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the embodiments should not be limited by any of the above-described exemplary embodiments, but should be defined only in accordance with the following claims and their equivalents.

What is claimed is:

1. A computer implemented method for serving a web page to reduce transmission bandwidth, comprising:
   intercepting a request for a web page including static and dynamic components;
   retrieving the requested web page from a server;
   reading transmission instructions for the web page, the instructions based on a tracking of content transmitted for the web page over time and an analysis of two or more identified versions of the web page, the tracking and analysis having identified one or more static and dynamic components of the web page;
   extracting the dynamic components of the retrieved web page based on the instructions;
   adding a Hypertext Transfer Protocol (HTTP) header to the dynamic components of the web page, wherein the HTTP header indicates separation of the web page into static and dynamic components and provides instructions for integrating the dynamic components of the web page with the static components of the web page;
   providing web content in response to the request, the provided web content including the dynamic components of the web page along with one or more references to the static components of the web page, without the static components of the web page corresponding to the one or more references,
   wherein the intercepting, the retrieving, the reading, the extracting and the providing are performed using one or more processors.

2. The method of claim 1, further comprising:
   providing static components of the web page in response to a request for the static components.

3. The method of claim 1, further comprising:
   providing the requested web page, including both static and dynamic components, when the transmission instructions are invalid or unavailable.

4. The method of claim 1, wherein a reference to a static component is an address local to a client.

5. The method of claim 1, wherein a reference to a static component is a web address.

6. A computer-based system for serving a web page to reduce transmission bandwidth, comprising:
   one or more processors;
   a first module configured to intercept a request for a web page including static and dynamic components;
   a second module configured to retrieve the requested web page from a server;
   a third module configured to read transmission instructions for the web page, the instructions based on a tracking of content transmitted for the web page over time and an analysis of two or more identified versions of the web page, the tracking and analysis having identified one or more static and dynamic components of the web page;
   a fourth module configured to extract the dynamic components of the retrieved web page based on the instructions;
   a fifth module configured to add a Hypertext Transfer Protocol (HTTP) header to the dynamic components of the web page, wherein the HTTP header indicates separation of the web page into static and dynamic components and provides instructions for integrating the dynamic components of the web page with the static components of the web page; and
   a sixth module configured to provide web content in response to the request, wherein the provided web content includes the dynamic components of the web page along with one or more references to the static components of the web page, without the static components of the web page corresponding to the one or more references,
   wherein the first module, the second module, the third module, the fourth module and the fifth module are implemented using the one or more processors.

7. The system of claim 6, further comprising a seventh module configured to provide static components of the web page in response to a request for the static components.

8. A computer based system for serving a web page to reduce transmission band width comprising:
   one or more processors;
   a splitter implemented on the one or more processors and configured to:
      intercept a request for a web page from a client, the web page including static and dynamic components;
      retrieve the requested web page from a server;
      read transmission instructions for the web page from an analyzer, the instructions based on the analyzer tracking of content transmitted for the web page over time and an analyzing of two or more identified versions of the web page, the tracking and analyzing having identified one or more static and dynamic components of the web page;
      extract the dynamic components of the retrieved web page based on the instructions;
      add a Hypertext Transfer Protocol (HTTP) header to the dynamic components of the web page, wherein the HTTP header indicates separation of the web page into static and dynamic components and provides instructions for integrating the dynamic components of the web page with the static components of the web page; and
      provide web content in response to the request, wherein the provided web content includes the dynamic components of the web page along with one or more references to the static components of the web page, without the static components of the web page corresponding to the one or more references.

9. The system of claim 8, wherein the splitter is further configured to provide static components of the web page in response to a request for the static components.

10. The system of claim 8, wherein the splitter is further configure to provide the requested web page, including both static and dynamic components, when the transmission instructions are invalid or unavailable.

* * * * *

UNITED STATES PATENT AND TRADEMARK OFFICE
CERTIFICATE OF CORRECTION

| | | |
|---|---|---|
| PATENT NO. | : 8,707,162 B1 | Page 1 of 1 |
| APPLICATION NO. | : 13/053805 | |
| DATED | : April 22, 2014 | |
| INVENTOR(S) | : Arvind Jain | |

It is certified that error appears in the above-identified patent and that said Letters Patent is hereby corrected as shown below:

In the Claims:

Column 10, line 21, claim 8, please replace "band width" with --bandwidth--.

Signed and Sealed this
Twenty-second Day of July, 2014

Michelle K. Lee
*Deputy Director of the United States Patent and Trademark Office*